United States Patent
Cossey et al.

(10) Patent No.: US 7,293,242 B2
(45) Date of Patent: Nov. 6, 2007

(54) FACILITATED SOURCE TO TARGET OBJECT EDITING FUNCTIONS

(75) Inventors: Brent W. Cossey, Roanoke, TX (US); Gregory P. Fitzpatrick, Keller, TX (US)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 10/270,889

(22) Filed: Oct. 15, 2002

(65) Prior Publication Data

US 2004/0070622 A1    Apr. 15, 2004

(51) Int. Cl.
*G06F 3/00*    (2006.01)
*G06F 9/00*    (2006.01)
*G06F 17/00*   (2006.01)

(52) U.S. Cl. ............... 715/770; 715/513; 715/501.1; 715/531; 715/724; 715/769

(58) Field of Classification Search ............... 715/513, 715/501.1, 531, 769, 770, 724; 345/352, 345/349, 339; 707/539
See application file for complete search history.

(56) References Cited

U.S. PATENT DOCUMENTS

| | | | |
|---|---|---|---|
| 5,157,763 A | 10/1992 | Peters et al. .............. 395/157 |
| 5,420,976 A | 5/1995 | Schell et al. .............. 395/159 |
| 5,694,563 A * | 12/1997 | Belfiore et al. ............ 715/821 |
| 5,715,413 A | 2/1998 | Ishai et al. ................. 395/349 |
| 5,764,873 A | 6/1998 | Magid et al. .............. 395/339 |
| 5,781,192 A * | 7/1998 | Kodimer ..................... 715/770 |
| 5,801,693 A | 9/1998 | Bailey ......................... 345/339 |
| 5,867,144 A | 2/1999 | Wyard ........................ 345/146 |
| 5,886,699 A * | 3/1999 | Belfiore et al. ............. 715/843 |
| 6,002,402 A | 12/1999 | Schacher .................... 345/352 |
| 6,026,233 A | 2/2000 | Shulman et al. ........... 395/701 |
| 6,061,058 A * | 5/2000 | Owens et al. .............. 715/769 |
| 6,061,697 A * | 5/2000 | Nakao ........................ 715/513 |
| 6,081,817 A * | 6/2000 | Taguchi ...................... 715/526 |
| 6,081,818 A | 6/2000 | Shich ......................... 707/539 |
| 6,097,391 A | 8/2000 | Wilcox ....................... 345/350 |
| 6,108,668 A | 8/2000 | Bates et al. ................ 707/203 |
| 6,177,935 B1 | 1/2001 | Munn ......................... 345/335 |
| 6,177,939 B1 | 1/2001 | Blish et al. ................. 345/346 |
| 6,185,591 B1 | 2/2001 | Baker et al. ............... 707/531 |
| 2002/0036662 A1 * | 3/2002 | Gauthier et al. ............ 345/835 |
| 2004/0210842 A1 * | 10/2004 | Qamar ....................... 715/538 |
| 2005/0149871 A1 * | 7/2005 | Broman et al. ............. 715/724 |
| 2005/0172018 A1 * | 8/2005 | Devine et al. .............. 709/223 |

OTHER PUBLICATIONS

Breaking the Copy/Paste Cycle: The Strectchable Selection Tool by Mark Apperley, Dale Flecher, Bill Rogers User Interface Conference, 2000. AUIC 2000.First Australasian Jan. 31-Feb. 3, 2000.*

(Continued)

*Primary Examiner*—John Cabeca
*Assistant Examiner*—Anita D. Chaudhuri
(74) *Attorney, Agent, or Firm*—Akerman Senterfitt

(57) ABSTRACT

A method for editing software objects can include identifying at least one user selection of at least a portion of an electronic document displayed within an application and prompting a user for a target destination to which the user selection is to be posted. A user input specifying the target destination to which the user selection is to be posted can be received and the user selection can be duplicated to the target destination.

22 Claims, 3 Drawing Sheets

OTHER PUBLICATIONS

U.S. Appl. No. 09/422,363, filed Oct. 21, 1999, Hammond.

C.A. Andrew, et al., *Text Display During Drag and Drop Operations*, IBM Technical Disclosure Bulletin, vol. 37, No. 09, pp. 511-512 (Sep. 1994).

U. Manber, *Creating a Personal Web Notebook, Proc. of the USENIX Symposium on Internet Technologies & Systems*, Institute of Electrical Engineers (1997).

* cited by examiner

FACILITATED SOURCE TO TARGET OBJECT EDITING FUNCTIONS

BACKGROUND OF THE INVENTION

1. Technical Field

The present invention relates to the field of computer software and, more particularly, to an enhanced method and system for editing user selections.

2. Description of the Related Art

Presently, editing functions employed within a graphic user interface (GUI), such as cut, copy, and paste functions, can be tedious to utilize. Multiple steps must be accomplished to complete many commonly conducted tasks. The most repetitive and arduous of these tasks involves posting user selections to target destinations.

Consider, for example, a typical copy/paste operation, wherein a user copies text from a Web site to a word processing document formatted for a specific word processing application. Initially, the user can select a block of text from within the Web site. Next, the selected text can be placed into a temporary storage location, such as a clipboard, by performing a "copy" operation. Then, the user must navigate to the word processing application, opening it if necessary. Once opened, the word processing application must be instantiated. That is, a document within the word processing application must be opened. At this point, the user can determine an insertion point within the target document and can perform a "paste" operation. The result of this sequence of operations is the placement of the selected text within the selected word processing document at the chosen insertion point.

Notably, throughout the copy/paste operation, the original application granting access to the Web site remained open. Accordingly, computer resources, such as random access memory (RAM) and central processing unit (CPU) processing cycles, were consumed by the open application. While such consumption of resources can be acceptable to users utilizing simple software applications hosted on powerful hardware, system performance can be unacceptably disrupted when the user utilizes demanding software applications hosted on limited hardware. Systems simultaneously running multiple applications, like an email program, word processor, and Web browser, are especially prone to system degradations during conventional copy/paste operations.

Additionally, the size of a user selection being pasted can be a limiting factor. A user selection can be especially problematic when the user selection includes at least one graphic, object linking and embedding (OLE) object, video, or other such large object. For example, a user copying multiple OLE objects, such as charts and documents, and placing them into a presentation application, can consume inordinate amounts of memory, often tens or hundreds of megabytes per edit. Moreover, because many modern applications allow users to "undo" the last series of operations, many sequences of edits and associated objects can be simultaneously stored within memory. Consequently, conventional editing can consume vast amounts of hardware resources resulting in system lags, general performance degradation, and even crashes.

Even those rare users not battling hardware limitations can be frustrated with traditional editing methods. In illustration, consider a user attempting to transfer information from a spreadsheet to a word processing document. Assume for formatting reasons that the user must copy the values of spreadsheet cells, one cell at a time. Using conventional editing processes, a user must select a cell from within a spreadsheet cell, trigger a copy function, navigate from the spreadsheet cell to the word processing document, specify a position within the word processing document to which a copy of the selected cell is to be posted, and trigger a paste operation. Each value transferred from each spreadsheet cell to the word processing document requires another iteration of the above process.

SUMMARY OF THE INVENTION

The invention disclosed herein provides a method for facilitating the source to target step of a graphic user interface (GUI) edit. Accordingly, the present invention provides a method for duplicating user selections using fewer actions than are required by conventional editing functions. Additionally, the invention requires fewer applications to be simultaneously accessed or 'opened' at one time and does not require that user selections be stored in a temporary storage location, such as a clipboard. Accordingly, the invention conserves hardware resources while simplifying editing duplication operations.

One aspect of the present invention can include a method for editing software objects. The method can include identifying at least one user selection of at least a portion of an electronic document displayed within an application and prompting a user for a target destination to which the user selection is to be posted. For example, once a user highlights a text segment within a word processing application, the invention can prompt the user for a target destination.

According to one embodiment of the present invention, a list of one or more predetermined target destinations can be displayed during the above prompting step. The prompting step can further allow a user to specify one or more target destinations other than one of the predetermined target destinations. For example, the prompting step can present the user with a list of three (3) documents, as well as provide a means for entering a file pathname.

Responsive to said prompting, the method can receive a user input specifying the target destination to which the user selection is to be posted. Notably, the target destination can be a file, a folder, or an application. Upon receiving said target destination, the method can duplicate the user selection to the target destination.

Another aspect of the present invention can include identifying at least one user selection of at least a portion of an electronic document displayed within an application. A descriptor specifying a target destination to which the user selection is to be posted can be received. The user selection can be duplicated to the target destination indicated by the descriptor. Notably, the descriptor can specify a target insertion point within the target destination to which the user selection is to be posted. The receiving step can occur before a duplicate of the user selection is placed into a memory location. Additionally, one or more of the descriptors available for selection can be based upon a descriptor list which can include, but is not limited to a hot list, a group based list, an application based list, a most recently used list, and a most frequently used list.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION OF THE INVENTION

The invention disclosed herein provides a method for facilitating the source to target step of a graphic user interface (GUI) edit. Specifically, the invention can enhance existing cut-copy-paste functions to include a destination targeting mechanism, which can be referred to as a "paste where" function. The method can provide a means for target destination selection that allows a user to duplicate selections made within an application with fewer steps than conventional editing functions. Additionally, the method can conserve hardware resources by requiring fewer applications to be simultaneously accessed or "opened" and by minimizing temporary storage requirements, such as clipboard memory space.

Figure 1:
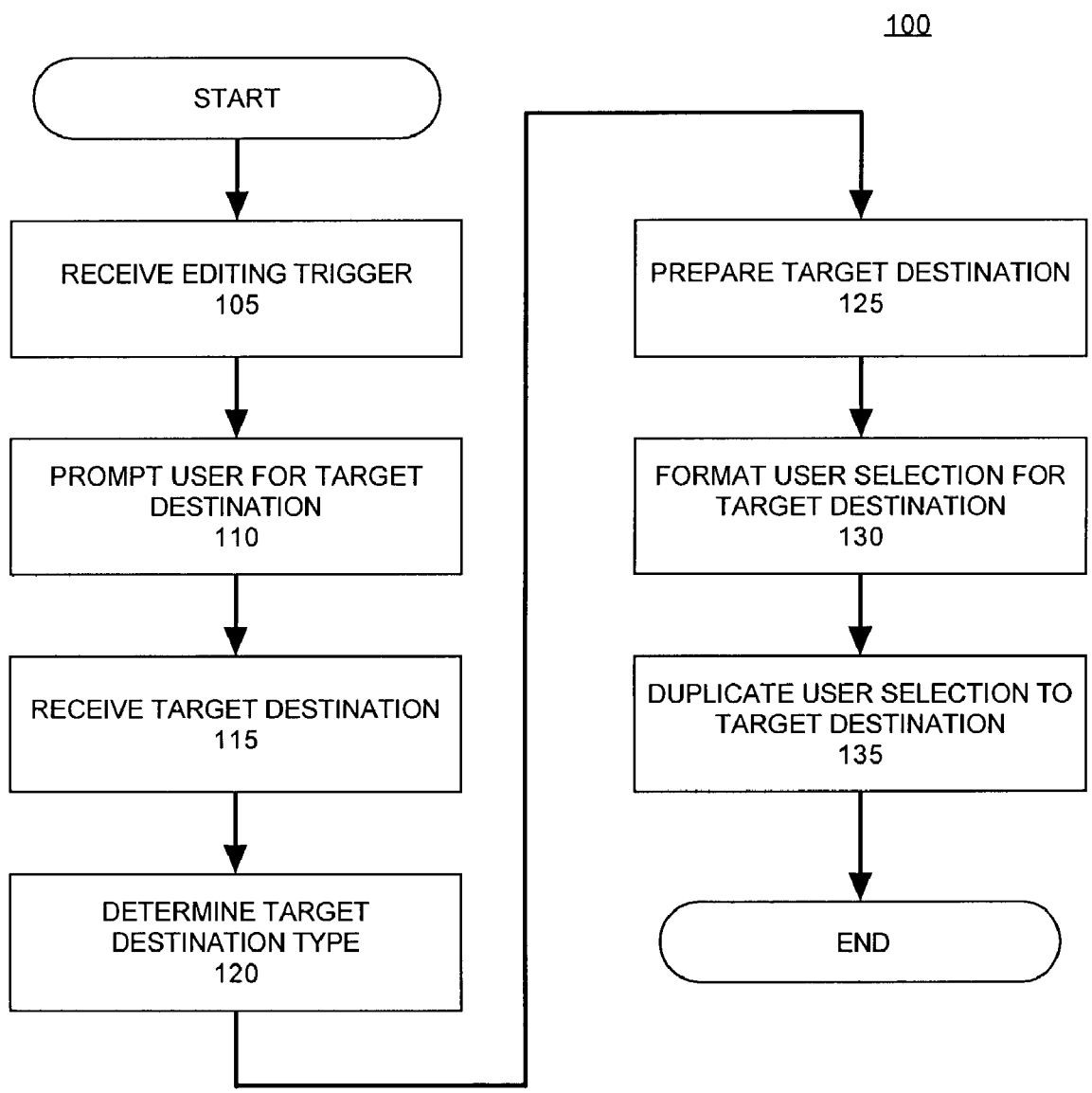
FIG. 1 is a flow chart illustrating a method for editing software objects according to the present invention.

FIG. 1 is a flow chart illustrating a method 100 for editing software objects according to the present invention. The method 100 can be performed in the context of interactive editing within a GUI. Method 100 begins in a state where a user has already made a selection using any of a variety of techniques. For example, a user can position a pointer over text in a Web page and specify a segment within the text perhaps causing the selection to be highlighted. In another embodiment, a user can make selections through keyboard editing commands, such as those available through an Emacs editor, a popular Unix/Linux line editor.

Notably, the user selection can be a set or the entirety of the content of an electronic document displayed within an application. A user selection can be distinguished from a file in that the user selection is a section of content displayed within an open application, while a file is a discrete storage object with an identity that exists outside an application instance. An electronic document is a form of information concerning some event or thing that is recorded or captured electronically so that the information will not be lost. For example, an electronic document can include, but is not limited to, a word processing document, a text document, a Web site, a spreadsheet, an email instance, a photograph, a presentation, and a database form.

Regardless of the manner in which a user selection is made, the user selection can, but need not, be placed into a temporary storage location, such as a clipboard. In one embodiment, a user can make a selection, then perform a copy function and place a copy of the user selection in a clipboard. Still, another function, a cut function, can place a user selection to a clipboard, while removing the user selection from an instance from which the selection was made. In another embodiment, a user can make a selection, and then trigger method 100 directly.

Accordingly, after a user selection is made, in step 105, a triggering event occurs which can activate the functionality of method 100. A triggering event can be generated responsive to a user voice command, a keyboard command, a menu bar command, and an icon activation command. Any event indicating a desire of a user to activate method 100 that is capable of being detected within an application can be a triggering event.

In step 110, the user can be prompted for a target destination. A target destination can be any object within which the user selection can be stored or presented. Target destinations can include new or existing files and directories, as well as applications. Numerous prompting techniques can be employed in step 110. For example, in one embodiment, the user can be presented with a list of predefined target destinations. In another embodiment, the user can be prompted for a pathname specifying the target destination. In yet another embodiment, the user can be presented with a graphical file management tool for specifying the target destination.

Notably, the prompting step need not display a pop-up view through which a destination location can be selected. Instead, the prompting step can occur through the presence of a descriptor capable of specifying a target destination. For example, a Web browser can contain a menu bar that provides a pull down list of descriptors for specifying target destinations. Alternately, a word processing application can provide a toolbar for selecting various document segments, wherein each-button depicting each segment can represent a descriptor. In another embodiment, a series of keystrokes, such as hot-key combinations, can activate one or more descriptors. In yet another embodiment, a descriptor can be triggered through a selection within an external hardware device, such as pressing a particular button on a joystick. Any user selectable event that is capable of being detected within an application can activate a descriptor. Furthermore, anytime a descriptor is activated the prompting step is satisfied.

Accordingly, in step 115, the method receives a target destination response from the user. Notably, the target destination response can be explicitly specified by the user in response to the aforementioned prompting step or can be a default response based on predetermined criteria, such as a default target destination previously defined by the user. One skilled in the art can appreciate that a target destination response can require interpretation. For example, a descriptor specifying a target destination may designate a particular target destination using a variable such as LOCATION_1 that has a particular meaning within an application.

In step 120, a target destination type can be determined. Exemplary target destination types can include, but are not limited to, an existing file, a new file, an existing directory, a new directory, and an application. If a target destination has to be interpreted as described above, such an interpretation can occur at this step.

Upon determining the target destination type, the target destination can be prepared in step 125. Notably, different preparations can be made depending on the target destination type. For example, in one embodiment, the determined target destination type can be an application. The application can be opened and subsequently instantiated in preparation for the placement of the user selection within the now open application instance. For instance, if the target destination type represents a word processing application, the method can open the word processing application, and then open a blank document within the word processing program. In this manner, the word processing application can be prepared to place the user selection within the opened blank document.

In another embodiment, the target destination type can be a folder. The method can determine if the folder exists. If the folder does not exist, the method can create a new folder.

The method can further prompt the user for a file name, thereafter creating a new file within the folder.

In yet another embodiment, the target destination type can be a file. If the file does not exist, the method can create a new file. If the file does exist, the method can prepare to append information to the file. Alternately, if the file exists, the method can open an application associated with the file, and instantiate the file. In an alternative implementation that presupposes the existence of a file selected as the target destination, the method can prompt the user to mark an insertion point within the file at which the user selection can be inserted. All subsequent "paste where" operations that select the file as the target destination can post user selections beginning at the marked insertion point.

In step 130, the user selection can be formatted. Different techniques can be employed to determine a desired target destination format of the user selection. For example, assuming that the target destination is a document specifically formatted, such as a rich text format document, a target destination format for the target destination can be determined and the user selection can be converted to match. Thusly, the user selection can be converted to a format compliant with the format of the target destination. In another embodiment, the method can prompt the user for a particular format. For example, if a graphic object was within the user selection, the user can be prompted for different graphic formats, such as GIF and JPEG. Still, cases may exist where no formatting of a user selection is required, therefore step 130 can be an optional step.

In step 135, a duplicate of the user selection can be posted to the target destination. Unlike editing functions like "move" which can delete a specified user selection from a source location during its operation, the content of the source location from which the user selection was made can remain unaffected by the "paste where" function.

Figure 2:
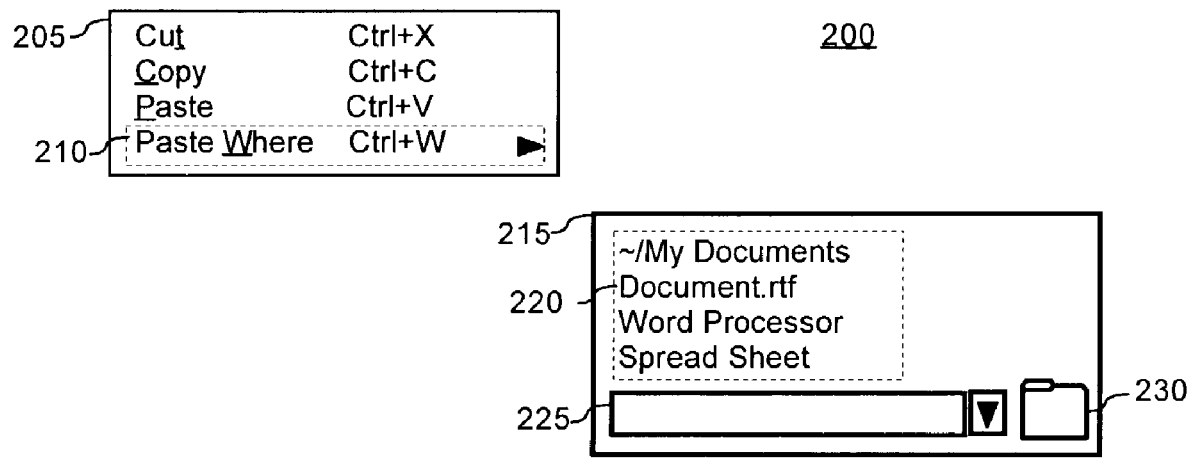
FIG. 2 is a schematic diagram illustrating a view of a graphical user interface prompting a user for a target destination for use with the present invention.

FIG. 2 is a schematic diagram illustrating a view of a GUI 200 prompting a user for a target destination for use with the present invention. GUI 200 can include an edit selection popup view 205, displaying a "paste where" section 210, and a target destination popup view 215, displaying a predefined target destination section 220, a pathname designation section 225, and an icon for displaying a file management view 230.

The edit selection popup view 205 can be triggered by any detectable event such as a keyboard command, a mouse command, or a timing event. For example, in one embodiment, upon a user selection highlighting a section, if a mouse pointer hovers over the highlighted section for a predefined time period, the edit selection popup view 205 can be displayed. Options within the edit selection popup view 205, such as the paste item, can be deactivated until requisite preconditions are satisfied. For example, a paste function can be unavailable until a user selection is placed in a temporary storage location, like a clipboard.

Notably, the "paste where" section 210, unlike a conventional paste, can be active before a user selection is placed in a temporary storage location. That is, although a user selection can be stored in temporary memory, such steps need not be taken. For example, to duplicate the user selection at a new location, the user may select the "paste where" option immediately upon specifying the user selection. Because the method can determine a destination location following a user selection, the requisite reference to the user selection is available to the method at the time of duplication.

A conventional paste operation, on the other hand, requires navigation away from the original user selection before duplication at a location can occur. Accordingly, the conventional paste operation requires some mechanism, such as temporary storage of a user selection in a clipboard. The method disclosed herein does not require storage of temporary information in a clipboard space before duplication.

Selection of the "paste where" section 210 can cause a target destination popup view 215 to be displayed. In one embodiment, displaying the target destination popup view 215 can cause the selection popup view 205 to be hidden. In another embodiment, view 205 can remain displayed when view 215 is displayed. For example, a user can navigate a mouse over the arrow depicted within the "paste where" section 210 of view 205 causing view 215 to be concurrently displayed with view 205. Moving the mouse to the left away from the arrow can cause view 215 to be hidden.

The predefined target destination section 220 can contain a list of predetermined target destinations. Accordingly, selecting an item from within the predefined target destination section 220 can allow a user an easy and efficient method for selecting a target destination.

The list of predefined target destinations can be specified as a most recently used list, a most frequently used list, a group based list, an application based list, a hot list, or any combination thereof. A most recently used list can contain a list of previous destination locations utilizing an algorithm, such as last in first out (LIFO), to maintain the list. A most frequently used list, on the other hand, can track the number of times, or frequency, over a predefined time period, such as thirty days, that particular target destination is selected. The most frequently used list, then displays those target destinations used the greatest number of times during the predefined time period.

Consider an illustrative example where the predefined target destination section 220 contains three target destinations. The last six chosen target destinations are exemplary destinations A, B, A, C, B, and D. A most frequently used list can contain target destinations A, B, and C. A most recently used list, based on the same exemplary values, can contain target destinations C, B, and D.

A group based list can populate a target destination list based on an application user's membership in a particular group. For example, the default group list for a user belonging to a "secretary" group can populate the predefined target destination section 220 differently than a second user belonging to an "analyst" group. Similarly, list population can be application based. For example, the predefined target destinations presented within the context of a word processing application can be limited to a set of documents. The same user making a user selection within a second application, such as a spreadsheet, can be presented with predefined target destinations consisting of a set of tables. Additionally, a target destination list can be a user defined hot list containing target destinations previously specified by the user. Notably, the target destination list can be a mix of files, locations, and/or applications, as shown in section 220.

The pathname designation section 225 can prompt a user for a fully qualified pathname. For example, a user can enter "C:/MyDocuments/MyFile" within the pathname designation section 225, thereby specifying a particular target destination. Additionally, the pathname designation section can record a set of previously entered target locations that a user can designate from a list appearing when a designated action, such as clicking on the depicted down arrow, occurs.

Figure 3:
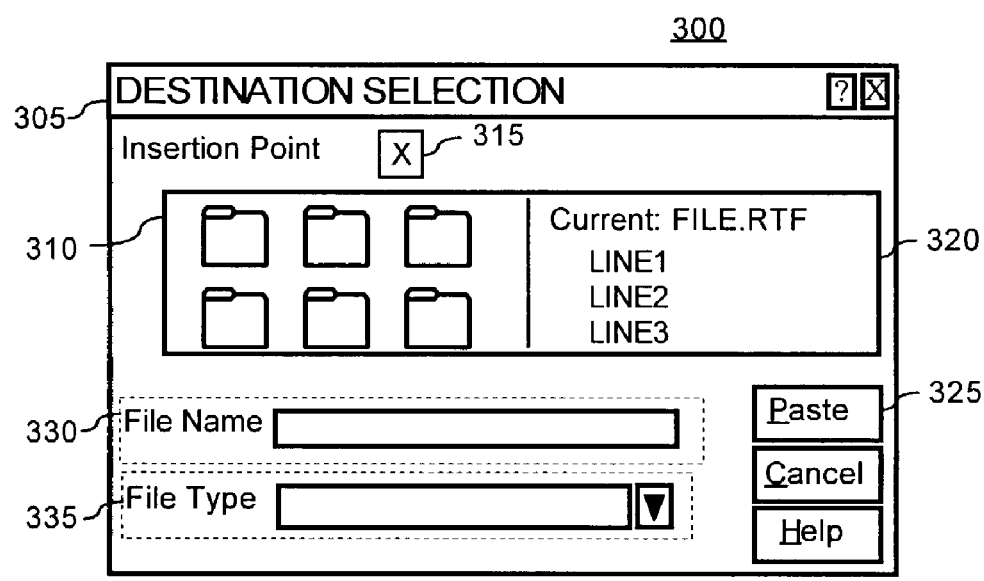
FIG. 3 is a schematic diagram illustrating another view of a graphical user interface prompting a user for a target destination for use with the present invention.

FIG. 3 is a schematic diagram illustrating a view of a GUI 300 that prompts a user for a target destination for use with the present invention. Such a view can be displayed responsive to many triggering events, such as clicking on an icon, such as icon 230 depicted in FIG. 2. GUI 300 can include a destination selection window 305 displaying an insertion point option 315, a navigation section 310, a paste button 325, an insertion point determination section 320, a file name field 330, and a file type section 335. The navigation section 310 can graphically present a file directory structure for a given system. A GUI based file management application is one example of a graphical utility for locating files.

The insertion point option 315 can allow a user to designate or mark a particular location within a target destination for placement of a duplicated user selection. Although depicted as a selectable check box, one skilled in the art can appreciate that any mechanism, such as a toggle button, can be used. A user setting an insertion point option 315 to a false state can be opting for system default behavior. For example, by default, a system may append a duplicated user selection to the end of a preexisting file. Alternately, a user setting an insertion point option 315 to a true state can be opting to designate a particular insertion point using some provided mechanism, such as the insertion point determination section 320.

The insertion point determination section 320 can visually display the contents of a selected file, such as one designated with navigation section 310. Furthermore, the insertion point determination section 320 can allow a user to specify a point within the displayed file. The selection insertion point can represent the location within the target destination at which the user selection is to be duplicated.

For example, a user can select a given file within the navigation section 310, such as FILE.RTF. The selected file can then be displayed within the insertion point determination section 320. The user can then selectively choose a location, such as the end of LINE1 and before LINE2. In this example, whenever the duplication feature of the method is triggered, in this example by the user selecting paste button 325, the user selection is duplicated within FILE.RTF posted after line LINE1 and before line LINE2. Still, a user can, alternately, select an insertion point within a line of text or between other objects.

The file name field 330 can allow a user to specify a pathname for a target destination. The file name field 330 can be linked to the navigation section 310, so that both display equivalent locations within a file structure. For example, if a user selects FILE.RTF within the navigation section 310, the file name field 330 can display the path for FILE.RTF.

The file type section 335 can allow a user to specify a file format. For example, a user selecting a down arrow within the file selection section 335 can cause a list of available file formats such as GIF, JPEG, and BMP to appear. This information can be used in converting content selected from a source to a specified format to be used within a target destination.

Figure 4:
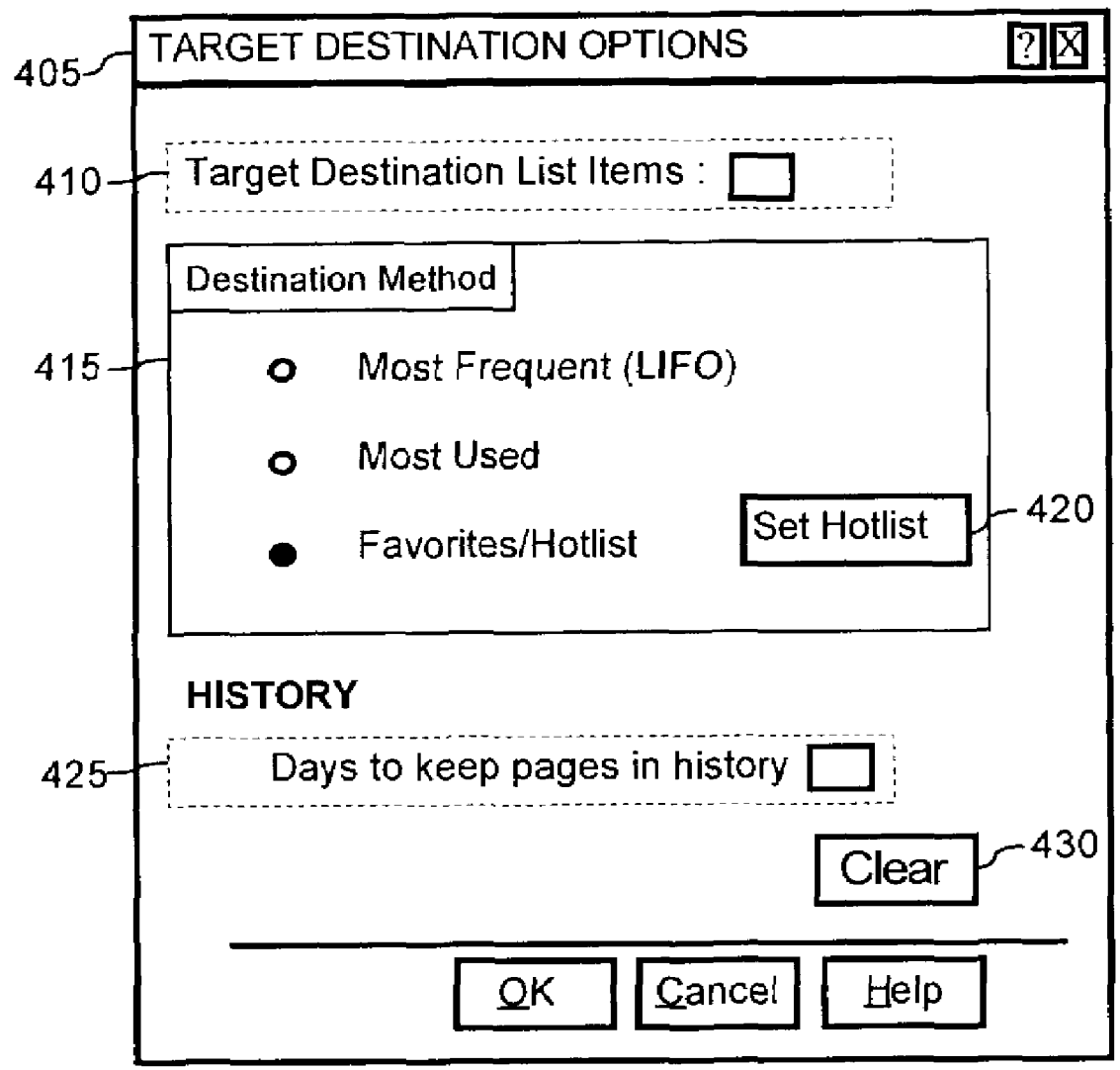
FIG. 4 is a schematic diagram illustrating a view of a graphical user interface for selecting predefined target destination options.

FIG. 4 is a schematic diagram illustrating a view of a GUI 400 for selecting predefined target destination options. GUI 400 can include a popup window 405 displaying an item number section 410, a destination method section 415, a hot list button 420, a history retention section 425, and a clear history button 430.

The item number section 410 can allow a user to specify the number of items that appear within a predefined target destination list. Accordingly, if a user specifies the number five (5) within the item number section 410, five (5) target destinations can be displayed within the list.

The destination method section 415, can allow a user to specify a particular list population mechanism from among numerous available options. A predefined target destination list can be specified as, but is not limited to, a most recently used list, and a most frequently used list, a group based list, an application based list, and a hot list. Some lists, such as the hot list, can be user defined. The hot list button 420 can trigger a display wherein a user can define target destinations for the hot list.

The history retention section 425 allows a user to specify a duration for retaining information used to populate dynamic target destination lists. For example, if a most frequently used list mechanism is utilized for determining predefined target destinations, a user specifying three (3) days in the history retention section 425 restricts a set of recorded target destinations to those occurring within the last three (3) days. Similarly, the clear history button 430 causes a system to delete presently stored information tracked by the system relating to dynamically populating predetermined target destination lists.

The various GUIs disclosed herein are shown for purposes of illustration only. Accordingly, the present invention is not limited by the particular GUI or data entry mechanisms contained within views of the GUI. Rather, those skilled in the art will recognize that any of a variety of different GUI types and arrangements of data entry, fields, selectors, and controls can be used.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer implemented method for editing software documents comprising the steps of:

identifying at least one user selection of at least a portion of a text of a first document displayed within an application;

prompting a user for a target point inside a document instance of a second document to which said user selection is to be posted, wherein prompting the user comprises displaying a graphical view window that includes an insertion point determination section within which an insertion point is designated where the portion of text of the first document is to be inserted automatically in the document instance without the user manually dragging the portion of text to the insertion point, and at least one of a file name field for specifying a pathname for a target destination containing the document instance, and a file type field for designating a file type to which the portion of text of the first document is to be converted, and wherein the document instance visibly presents a portion of the second document for selecting the target point, said portion being presented within the graphical view window and comprising less than the entirety of the second document;

receiving a user input specifying the target point inside the document instance to which the user selection is to be posted; and, duplicating said user selection to said target point inside the document instance, wherein the duplicating visibly inserts the portion of the text within the document instance at the target point and updates the second document to include the portion of the text at the corresponding target point.

2. The computer implemented method of claim 1, wherein said receiving step occurs before a duplicate of said user selection is placed into a memory location.

3. The computer implemented method of claim 1, wherein said document instance is presented within the application within which said user selection was made.

4. The computer implemented method of claim 1, further comprising the steps of:
prompting for a target destination of said second document;
receiving a user input specifying target destination; and,
within said duplicating step, pasting said user selection to said second document at said target destination.

5. The computer implemented method of claim 4, wherein said prompting step further comprises populating a target destination list based on an application user's membership in a group.

6. The computer implemented method of claim 5, wherein said presenting step further comprises the step of providing a mechanism with which the user can specify a target destination which is other than one of said predefined target destinations.

7. The computer implemented method of claim 5, further comprising the steps of:
prompting the user to select a number of displayed predefined target destinations; and,
displaying said number of predefined target destinations within said presenting step.

8. The computer implemented method of claim 5, further comprising the step of specifying said predefined target destinations from a list, said list selected from the group consisting of a hot list, a group based list, an application based list, a most recently used list, and a most frequently used list.

9. The computer implemented method of claim 8, further comprising the steps of:
prompting a user to reset stored data upon which said lists are based; and,
responsive to receiving a user reset request, resetting the stored data upon which said lists are based.

10. The computer implemented method of claim 5, wherein said target destination of said receiving step is selected from the group consisting of a file, a directory, and an application.

11. The computer implemented method of claim 5, said duplicating step further comprising the steps of:
prompting the user for the target insertion point in the second document; and, receiving a user input specifying the target insertion point, wherein said duplicating step inserts said user selection into said target destination location at said target insertion point.

12. A machine-readable storage having stored thereon, a computer program having a plurality of code sections, said code sections executable by a machine for causing the machine to perform the steps of:
identifying at least one user selection of at least a portion of a text of a first document displayed within an application;
prompting a user for a target point inside a document instance of a second document to which said user selection is to be posted, wherein prompting the user comprises displaying a graphical view window that includes an insertion point determination section within which an insertion point is designated where the portion of text of the first document is to be inserted automatically in the document instance without the user manually dragging the portion of text to the insertion point, and at least one of a file name field for specifying a pathname for a target destination containing the document instance, and a file type field for designating a file type to which the portion of text of the first document is to be converted, and wherein the document instance visibly presents a portion of the second document for selecting the target point, said portion being presented within the graphical view window and comprising less than the entirety of the second document;
receiving a user input specifying the target point inside the document instance to which the user selection is to be posted; and,
duplicating said user selection to said target point inside the document instance;
wherein the duplicating visibly inserts the portion of the text within the document instance at the target point and updates the second document to include the portion of the text at the corresponding target point.

13. The machine-readable storage of claim 12, wherein said receiving step occurs before a duplicate of said user selection is placed into a memory location.

14. The machine-readable storage of claim 12, wherein said document instance is presented within the application within which said user selection was made.

15. The machine-readable storage of claim 12, further comprising the steps of:
prompting for a target destination of said second document;
receiving a user input specifying target destination; and,
within said duplicating step, pasting said user selection to said second document at said target destination.

16. The machine-readable storage of claim 15, wherein said prompting step further comprises populating a target destination list based on an application user's membership in a group.

17. The machine-readable storage of claim 16, wherein said presenting step further comprises the step of providing a mechanism with which the user can specify a target destination which is other than one of said predefined target destinations.

18. The machine-readable storage of claim 16, further comprising the steps of:
prompting the user to select a number of displayed predefined target destinations; and,
displaying said number of predefined target destinations within said presenting step.

19. The machine-readable storage of claim 16, further comprising the step of specifying said predefined target destinations from a list, said list selected from the group consisting of a hot list, a group based list, an application based list, a most recently used list, and a most frequently used list.

20. The machine-readable storage of claim 19, further comprising the steps of
   prompting a user to reset stored data upon which said lists are based,
   responsive to receiving a user reset request, resetting the stored data upon which said lists are based.

21. The machine-readable storage of claim 15, wherein said target destination of said receiving step is selected from the group consisting of a file, a directory, and an application.

22. The machine-readable storage of claim 15, said duplicating step further comprising the steps of:
   prompting the user for the target insertion point; and,
   receiving a user input specifying the target insertion point, wherein said duplicating step inserts said user selection into said target destination location at said target insertion point.

* * * * *